Patented May 11, 1943

2,318,714

UNITED STATES PATENT OFFICE 2,318,714

EMULSION

Harold J. Robertson, Tulsa, and Thomas G. Wisherd, Sand Springs, Okla., assignors to Sinclair Refining Company, New York, N. Y., a corporation of Maine No Drawing. Application January 24, 1940, Serial No. 315,382

2 Claims. (Cl. 252—330)

This invention relates to the separation of crude petroleum oil from the "oil-in-water" emulsions which occur more or less frequently in the oil fields; or in the de-salting operations, and more particularly to the breaking of such emulsions, or the separation of the oil from the brine, by the addition to the emulsion of a relatively small amount of aluminum chloride.

Crude oil, as produced from oil wells, is usually accompanied by more or less water, which usually contains a considerable amount of salts in solution, although at times the amount of salts in solution may be relatively small. Frequently, the oil as produced from the well is emulsified with the water or brine, some of the emulsions being quite stable and others being readily resolved. Most of the emulsions are of the "water-in-oil" type in which the water is emulsified in the oil. These emulsions are commonly referred to as "BS." Methods of treating BS emulsions, that is, the "water-in-oil" emulsions, to break the emulsions and recover the oil, are well known in the industry and are widely used. The most common methods are electrical precipitation or the addition of a small quantity of a suitable reagent such as the sulfonates, fixed oils, soaps, resins, etc., and mixtures and combinations of such materials.

In some cases, however, a portion of the crude oil as produced is emulsified in the water or brine in the form of an "oil-in-water" emulsion, in which the water or brine is the continuous phase and the oil is the disperse phase. Such emulsions are capable of indefinite dilution with water without breaking, and in contrast with the BS type of emulsion, that is, the "water-in-oil" type, they do not separate from the brine nor float on the brine, but on the contrary readily mix with the brine and separate with it from the oil. The demulsifying agents ordinarily used to break the BS emulsions are not effective for treating such "oil-in-water" emulsions.

In the de-salting operations which are frequently carried out on crude oil to separate therefrom salts which they contain, "oil-in-water" emulsions are sometimes formed. These cannot be resolved by the use of the treating agents used for BS emulsions or the like. They are miscible with brine or water and are capable of almost indefinite dilution in brine or water without separation of the emulsified oil.

In accordance with the present invention, such "oil-in-water" emulsions are resolved by the addition of a small amount of aluminum chloride, either as such or in solution. The addition of the aluminum chloride is usually by the methods commonly used for the treatment of petroleum emulsions, i. e., by addition of the aluminum chloride to a large batch of the emulsion in a tank in which the emulsion, after breaking, can separate to permit removal of the oil as by decantation, by the addition of the reagent to the emulsion in a flow line, by means of a proportioning pump or a pressure tank, with subsequent separation of the oil and the brine in a settling tank, etc. Suitable methods of adding the reagent to the emulsion are well known, and need not be further described.

The amount of aluminum chloride to be added to the emulsion to cause its resolution will vary, depending upon a number of factors, including the nature of the emulsion, i. e., whether it is difficult or easy to resolve, the available equipment, i. e., whether there is sufficient equipment, such as settling tanks, to permit the emulsion to stand for some time for separation, or whether, in view of a limited supply of equipment, the emulsion must be separated with reasonable rapidity, and the temperature of the emulsion, or the temperature to which it is heated. In general, if the resolution of the emulsion is rather slow, batch treatment is advantageous, for example, in tanks into which the brine containing the emulsified oil is run after separation from the petroleum oil in the wash tank in the field. If the resolution is fairly rapid, a continuous method of treatment, as by addition of the aluminum chloride to the mixture of petroleum and emulsified brine from the well by means of a suitable pump, with subsequent passage of the mixture through a heating boiler and into a wash tank, where the oil rises to the surface and overflows at the top to stock tanks, while the brine, substantially free from oil, is removed continuously by means of a syphon at the bottom of the wash tank, may be used with advantage.

In some cases, heating of the emulsion is unnecessary. In others, the emulsion, for effective, rapid resolution, should be heated, for example, to around 140° F. By heating, the rate of separation may be greatly increased, and the amount of reagent required decreased.

The invention will be further illustrated by the following specific example, but it is not limited thereto.

A 35° Bé. aluminum chloride solution, containing a small amount of a corrosion inhibitor, such as one of the inhibitors used in the treatment of oil well formations with dilute hydrochloric in the process known as "acidizing" and described in U. S. Patent 1,877,504, advantageously a product such as that sold by the American Chemical Paint Company under the trade name "Rodine" which is hereinafter further identified, is added in the flow line by means of a chemical pump to the mixture of petroleum oil and brine produced from oil wells at the Lost Soldier A lease of the Sinclair Wyoming Oil Company. The brine from these wells contains about 1% of oil by volume emulsified therein, and is of a dirty yellowish brown color. The solution is added in the proportion of 1 part of solution to 16,000 parts of water by volume. The mixture of petroleum, emulsified brine and aluminum chloride solution is passed through a heating boiler where it is heated to around 140° F. and into a wash tank, where the free petroleum oil and the oil separated from the brine emulsion rise to the surface and overflow to stock tanks, the clarified brine being continuously removed by means of a syphon in the bottom of the wash tank adjusted to maintain a constant level. The brine removed from the tank is colorless and substantially free from oil.

The aluminum chloride may be added to the emulsion either in solid form, or as a more or less concentrated solution. In the batch processes, the solid form, whether hydrated or anhydrous, may be used. In continuous processes, with addition of the aluminum chloride by means of a chemical pump or the like, a solution of the aluminum chloride should be used, advantageously a concentrated solution. In general, to avoid corrosion by the aluminum chloride of the tanks, flow lines, etc., a corrosion inhibitor, such as one of the nature above referred to, should be used.

The solutions of aluminum chloride which may be used may be prepared in any convenient way, but in view of the fact that aluminum chloride dissolves with the evolution of considerable heat, and, if anhydrous, with great violence, precautions should be taken. It is advantageous to use the hydrated salts, which do not give off as much heat and do not dissolve with the violence with which the anhydrous salt dissolves. If the solution is prepared in a steel drum, the corrosion inhibitor should be added to the solution at the time of making, to prevent corrosion of the drum. The following is a typical example of the preparation of a batch of solution:

38 gallons of cold water are run into a jacketed steel kettle provided with mixing rabbles or other means of agitation. Cold water is turned into the jacket and hydrated aluminum chloride is gradually added with continuous stirring. The rate of addition of the salt is such that the temperature does not exceed 150° F. While the salt is being added, a small amount of Rodine, preferably formula No. 41, is added. This inhibitor is a high molecular weight organic acid. After about 300 pounds of aluminum chloride have been dissolved, 22 gallons of water are added, and the addition of the salt and the inhibitor is continued until a total of 675 pounds of hydrated aluminum chloride and 1 gallon of Rodine are dissolved. The final solution will have a gravity of approximately 35° Bé. More concentrated solutions, while they may be used in the treatment of the emulsion, may result in the separation of salt crystals on standing.

We claim:
1. The process for the separation of petroleum from "oil-in-water" emulsions of crude oil and brine which comprises adding to the emulsion a small amount of aluminum chloride.
2. The process for the separation of petroleum from "oil-in-water" emulsions of crude oil and brine which comprises adding to the emulsion a small amount of an aqueous solution of aluminum chloride.

HAROLD J. ROBERTSON.
THOMAS G. WISHERD.